Figure 1:
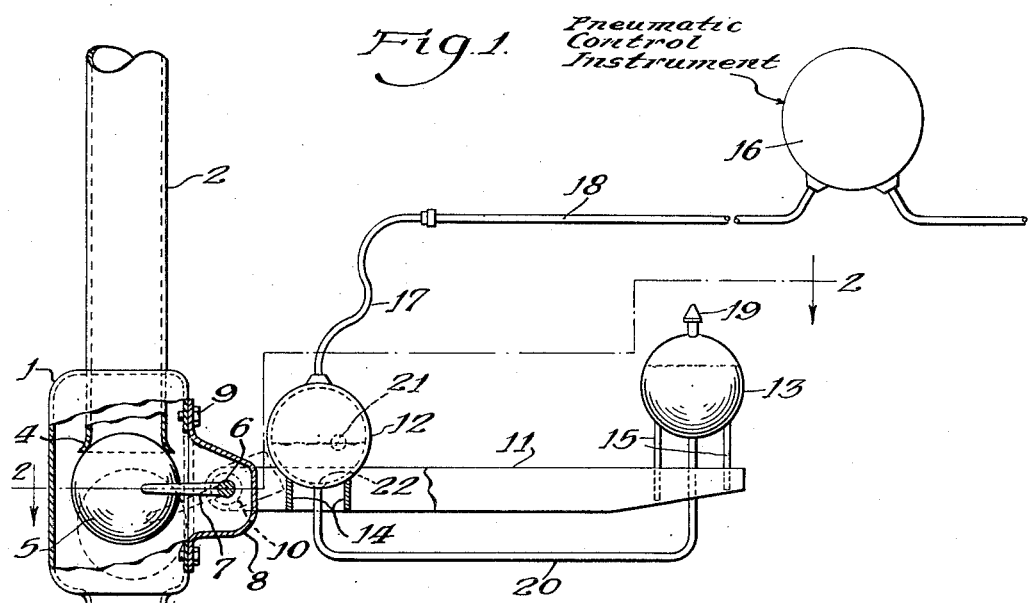

May 24, 1955

J. BEAM 2,708,946

FLOW CONTROL VALVE REGULATED BY VARIABLE
AIR PRESSURE AND LIQUID DISPLACEMENT

Filed Oct. 28, 1949

Inventor:
Jon Beam
By M. P. Venema
Attorney
Philip J. Liggett
Agent

United States Patent Office 2,708,946
Patented May 24, 1955

2,708,946

FLOW CONTROL VALVE REGULATED BY VARIABLE AIR PRESSURE AND LIQUID DISPLACEMENT

Jon Beam, Blue Ridge, Ga., assignor to Universal Oil Products Company, Chicago, Ill., a corporation of Illinois Application October 28, 1949, Serial No. 124,055

1 Claim. (Cl. 137—527.8)

This invention relates to an improved type of flow control valve which may be adjusted or regulated automatically through the use of a variable pressure air stream from a suitable pneumatic control instrument.

The usual pneumatically controlled valve, or fluid controlled valve, is of the diaphragm or piston type, wherein a fluid or air stream of varying pressure operates against a diaphragm or piston to provide the direct movement of a suitable stem or shaft that in turn adjusts a valve plug or other control means within the valve housing. The present valve utilizes air pressure fluctuations to vary the leverage or force applied to a valve plug or valve stop operating in conjunction with a valve seat and against the flow stream, or in other words to adjust the position of the valve plug with respect to the valve seat in a manner permitting the regulation and control of a fluid stream through the valve body.

It is therefore a principal object of the present invention to provide a pneumatically or air operated valve that permits a relatively low pressure air or gas stream to effect a liquid displacement and in turn vary the mechanical advantage exerted through a leverage means and thereby effect the regulation of a valve plug and the fluid stream.

It is also an object of the present invention to eliminate the necessity of the usual diaphragm motor or cylinder and piston type of fluid pressure operated valves, which are in turn normally regulated by a suitable pneumatic control instrument. A low pressure air stream is utilized in the improved valve to displace a liquid between suitably placed reservoirs and in turn vary the adjustment of the flow control valve.

It is a further object of the present invention to provide an improved flow control valve that utilizes a movable liquid and lever arm type of construction and arrangement that permits a closely controlled automatic adjustment of the valve plug with respect to its seat, as well as a construction which inherently permits the displacement of the valve plug and its connecting lever arm from pressure surges in the flow stream so that the valve functions also as a pressure relief means.

Briefly, a simplified embodiment of the present improved valve comprises in combination, an enclosed valve housing having a fluid inlet and fluid outlet connecting thereto, a suitable valve seat within the housing at the fluid inlet thereto, and a suitable valve plug adapted to close against the valve seat within the housing, the valve plug connecting to a rotatable shaft extending substantially horizontally through the housing, a liquid reservoir supporting beam connecting with and extending laterally from the shaft externally of the valve housing, said beam having two interconnected liquid reservoirs supported thereon with one of the reservoirs positioned close to the housing while the other is spaced therefrom at the end of the beam, an air supplying conduit connecting with the upper portion of one of the reservoirs and vent means extending from the upper portion of the other reservoir, whereby a varying air supply to the air supplied reservoir displaces a liquid medium from one reservoir to the other and thereby varies the leverage exerted through the rotatable shaft to the valve plug within the valve housing and in turn provides a resulting adjustment of the valve plug with respect to the valve seat therein.

It may thus be seen that it is a feature of the present invention to have an adjustable flow control valve that operates by leverage and utilizes a varying air pressure to displace a liquid medium within two interconnecting reservoirs, such that as the liquid is shifted between one reservoir and the other and in turn vary the leverage or moment with respect to the rotatable shaft. Thus, the positioning of the valve plug, which provides an opposing weight at a constant distance from the rotatable shaft, may be adjusted and varied with respect to the valve seat within the housing. In other words, the relative linear positions of the valve plug and the reservoirs with respect to the rotatable shaft, which provides a leverage fulcrum, do not vary, but the shifting of the liquid medium between the reservoirs effects a varying leverage or moment with respect to the plug and the resulting positioning of the valve plug within the housing.

It is a further feature of the present apparatus to have one of the liquid reservoirs elevated somewhat higher than the other, with respect to the supporting beam which is external of the valve housing, and the air supply conduit connected to the lower of the two reservoirs such that the liquid medium used within the reservoirs is caused to flow from the lower of the reservoirs to the higher, by an increased air pressure. Conversely, when the air pressure is reduced, the liquid in the higher of the reservoirs flows by gravity back into the lower reservoir of the two. The higher of the reservoirs is provided with an air vent in order that the liquid medium may freely move into and out of that particular reservoir, as the air pressure to the other is increased or lessened.

In addition to providing a valve which is adjustably controlled by pneumatic control instruments, the lever arm type of construction, like the various types of weighted valves provides a valving apparatus that permits the valve plug to be automatically moved by pressure surges, thus permitting the valve to function as both a control valve and a pressure relief valve. This type of valve may be used in connection with many operations or services, being particularly suitable for the control of granular, or fluidized particle streams in riser or standpipe lines, as well as for all types of liquid and gaseous flow streams.

Reference to the accompanying drawing will serve to illustrate the construction and arrangement of a simplified embodiment of the improved automatic valve, while the accompanying description relating to the drawing will serve to point out additional features and advantages of the control valve.

Figure 1 of the drawing indicates an elevational view of the improved flow control valve, with one means of connecting a pneumatic controlled instrument to the device.

Figure 2:
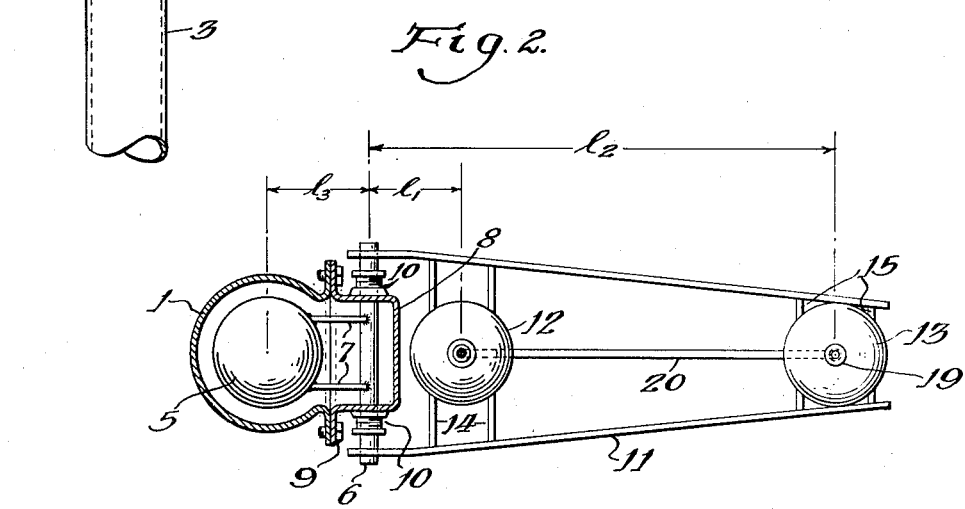

Figure 2 of the drawing is a plan view, partially in section, of the simplified embodiment of the Figure 1, as indicated by the line 2—2 in Figure 1 of the drawing.

Referring now to the drawing, there is indicated a valve housing 1 which provides a substantially enclosed chamber having an inlet conduit 2 and an outlet conduit 3 connected thereto. In this particular embodiment, the inlet conduit 2 extends into the interior of the valve housing 1 and has an end portion 4, which is machined or finished to adapt itself to a valve plug 5 and form a suitable valve seat. The valve plug 5 is a spherically shaped ball-like member and is connected to a rotatable shaft 6 by means of suitable bars or connecting members 7, and the valve plug 5 is positioned with respect to the shaft 6, such that it will seat itself across the valve seat 4 at the end of the inlet port.

In a preferred embodiment, the rotatable shaft 6 is supported in a removable portion 8 of the valve housing 1. This removable portion 8 is indicated as being attached to the main valve housing 1 by a plurality of bolts or cap screws 9 extending around flanged portions of both the members 1 and 8. As indicated more clearly in Figure 2 of the drawing, the removable portion 8 has the rotatable shaft 6 extending therethrough at each side of the housing, with suitable shaft bearing and packing gland means 10 being provided at each side of the housing member 8. Externally of the valve housing and connecting rigidly to each end of the rotatable shaft 6 is a forked or yoke-like beam or frame 11 which is suitable to support two liquid reservoirs 12 and 13. The liquid reservoirs 12 and 13 are indicated as being supported by suitable cross-bars or supporting members 14 and 15, which extend laterally across the frame or beam 11.

In this embodiment, the liquid reservoirs are indicated to be of a spherical form, with reservoir 12 the one nearest the valve housing being somewhat lower in elevation than reservoir 13 which is supported at the end of the beam 11. The difference in elevation is provided such that the liquid material caused to flow from the lower reservoir to the other and provide a difference in the leverage applied to the weighted plug 5, will return by gravity, when the air pressure is subsequently reduced. The lower reservoir, in this case the reservoir 12, is connected to the air supply and the pneumatic control instrument 16 through a flexible line 17 and conduit 18. Thus, the pneumatic control instrument 16 may vary the air pressure to the closed reservoir 12 and in turn vary the level of the liquid medium therein. An increased pressure decreases the level in reservoir 12 and increases the level in 13, the latter reservoir being provided with an air vent 19 so that the liquid level is free to move upwardly or downwardly in reservoir 13 as may be required. Conversely, as the pneumatic pressure within the reservoir 12 is decreased, the liquid medium flows from the elevated reservoir 13 back into the reservoir 12 and decreases the leverage arm or moment applied against the valve plug 5. As a safety feature, the reservoir connecting with the air supply, in this case reservoir 12, is provided with an internal floating ball 21, and an internal seat 22 at the inlet to the liquid conduit 20. Thus, in case all of the liquid medium is forced out of the reservoir 12, it will not be blown or forced on out of the reservoir 13 through the air vent 19.

In operation, and as may be noted in connection with Figure 2 of the drawing, when the leverage or moment provided by the weight of the valve plug 5 at the distance $l_3$ is greater than the leverage or moment provided by the reservoir 12 at the distance $l_1$ plus the additional amount provided by the reservoir 13 at the distance $l_2$, then the valve plug will pivot downwardly around the rotatable shaft 6 and take a position away from the valve seat 4. Conversely, when the leverage or moment provided by the summation of the reservoirs 12 and 13 at their respective distances $l_1$ and $l_2$ is greater than the moment or leverage provided by the valve plug 5 at the distance $l_3$, then valve plug 5 is maintained in a closed position against the valve seat 4. Also, by suitable flow control or flow rate indicating instruments connecting with the pneumatic control instrument 16, the latter can automatically vary the air supply to the reservoir 12 and in turn vary the liquid level between the two reservoirs in a manner to obtain a definite desired balance with a controlled small or large displacement of the valve plug 5 from the face of the valve seat 4.

The two reservoirs 12 and 13 in the present embodiment, are connected by tube or conduit 20, which is suitable to freely permit the movement of the liquid medium from one reservoir to another. It is not intended to limit the particular apparatus to any one type of liquid medium. Mercury may be used where a heavy liquid medium is desired, although oil, glycerine and the like may provide a suitable liquid medium. Water and many other liquid mediums may be used in the apparatus but have the disadvantage of rapidly evaporating and effecting the normal liquid level, so that it is advisable to utilize a liquid medium not normally subject to evaporation.

To those familiar with apparatus of this type, it is obvious that modifications may be made in the construction and arrangement of the apparatus, within the scope of the present invention.

The size and weight of the valve plug 5 as well as the size and positioning of the liquid reservoirs with respect to the rotating shaft 6 as a fulcrum, will vary with the flow and type of service encountered. The size of the reservoirs 12 and 13 and the distances $l_1$ and $l_2$ will necessarily increase for flow control valves operating with large size conduits or in connection with high pressure flow stream. Further, it is not intended to limit the shape of the valve plug 5 to that of the sphere, for obviously a conically or elliptically shaped plug may well be used in connection with a flow stream without causing undue turbulence or the like. Other than spherically shaped reservoirs on the beam or frame 11 may also be used in connection with the external portion of the apparatus, within the scope of the present invention.

I claim as my invention:

A flow control valve comprising a housing having an inlet, an outlet, and a valve seat for said inlet and a removable side section between said inlet and outlet, a rotatable shaft extending through said side section, a movable valve plug within the housing spaced laterally from and having means connecting to said shaft for rotation therewith and adapted to close it against said seat, a supporting beam exteriorly of the housing fixedly mounted on and extending laterally from said shaft on the side thereof opposite said plug, a pair of liquid reservoirs supported in laterally spaced relationship on said beam, a conduit interconnecting said reservoirs, a liquid partially filling said reservoirs and said conduit, a flexible conduit connecting with and adapted to supply varying air pressure to one of said reservoirs, and an air vent at the upper portion of the other of said reservoirs.

References Cited in the file of this patent

UNITED STATES PATENTS

| | | |
|---|---|---|
| 388,654 | Erwood | Aug. 28, 1888 |
| 411,875 | Ryder | Oct. 1, 1889 |
| 506,806 | Baum | Oct. 7, 1893 |
| 1,324,515 | Otti | Dec. 9, 1919 |
| 1,469,871 | Allen | Oct. 9, 1923 |

FOREIGN PATENTS

| | | |
|---|---|---|
| 13,144 | Great Britain | June 12, 1903 |